(12) United States Patent
Hancock et al.

(10) Patent No.: US 12,522,197 B2
(45) Date of Patent: Jan. 13, 2026

(54) MAINTAINING MULTI-AXLE DRIVE CAPABILITY IN A HYBRID VEHICLE

(71) Applicant: JAGUAR LAND ROVER LIMITED, Coventry (GB)

(72) Inventors: Matthew Hancock, Rugby (GB); Olivier Roques, Banbury (GB); Christina O'Sullivan, Warwick (GB); William Harrison, Coventry (GB); Gareth Jones, Warwick (GB); Christopher Blakesley, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 264 days.

(21) Appl. No.: 17/920,768

(22) PCT Filed: Apr. 21, 2021

(86) PCT No.: PCT/EP2021/060449
§ 371 (c)(1),
(2) Date: Oct. 21, 2022

(87) PCT Pub. No.: WO2021/214180
PCT Pub. Date: Oct. 28, 2021

(65) Prior Publication Data
US 2023/0159016 A1 May 25, 2023

(30) Foreign Application Priority Data
Apr. 21, 2020 (GB) ...................................... 2005800

(51) Int. Cl.
B60W 20/13 (2016.01)
B60W 10/06 (2006.01)
(Continued)

(52) U.S. Cl.
CPC ............ B60W 20/13 (2016.01); B60W 10/06 (2013.01); B60W 10/08 (2013.01);
(Continued)

(58) Field of Classification Search
CPC ...... B60W 20/13; B60W 10/06; B60W 10/08; B60W 10/119; B60W 2520/26;
(Continued)

(56) References Cited

U.S. PATENT DOCUMENTS 9,027,680 B2   5/2015   Sawada et al.
2010/0070123 A1   3/2010   Itoh et al.
(Continued)

FOREIGN PATENT DOCUMENTS

JP        2003204604 A    *  7/2003

OTHER PUBLICATIONS

JP2003204604A_English (Year: 2003).*
(Continued)

Primary Examiner — Faris S Almatrahi
Assistant Examiner — Dana F Artimez
(74) Attorney, Agent, or Firm — TROUTMAN PEPPER LOCKE LLP; Dustin B. Weeks; Nicholas H. Doss

(57) ABSTRACT

Aspects of the present invention relate to a method and to a control system for maintaining multi-axle drive capability in a vehicle, the method comprising: operating an internal combustion engine to provide a torque to a first axle of the vehicle, and to a first electric machine to generate electrical power; controlling the generation of electrical power by the first electric machine in dependence on a requirement for torque at a second axle of the vehicle; and operating a second electric machine to receive the electrical power generated by the first electric machine and provide the torque to the second axle.

16 Claims, 3 Drawing Sheets

(51) Int. Cl.
*B60W 10/08* (2006.01)
*B60W 10/119* (2012.01)

(52) U.S. Cl.
CPC ....... *B60W 10/119* (2013.01); *B60W 2520/26* (2013.01); *B60W 2710/0666* (2013.01); *B60W 2710/083* (2013.01); *B60W 2710/305* (2013.01); *B60W 2720/403* (2013.01)

(58) Field of Classification Search
CPC ... B60W 2710/0666; B60W 2710/083; B60W 2710/305; B60W 2720/403; B60W 30/02; B60W 30/18172; B60W 10/30; B60W 20/20; B60W 20/10; Y02T 10/62; B60K 6/485; B60K 6/448; B60K 6/52; B60K 2006/268; B60K 6/44
See application file for complete search history.

(56) References Cited

U.S. PATENT DOCUMENTS

| | | | |
|---|---|---|---|
| 2010/0152938 A1 | 6/2010 | Aoki et al. | |
| 2011/0094809 A1* | 4/2011 | Poschmann | B60K 1/02 180/65.225 |
| 2012/0010041 A1 | 1/2012 | Soliman | |
| 2012/0158230 A1* | 6/2012 | Nicholls | B60W 10/18 180/65.265 |
| 2012/0312122 A1 | 12/2012 | Miller | |
| 2013/0211640 A1* | 8/2013 | Maier | B60K 23/0808 180/65.265 |
| 2013/0269921 A1* | 10/2013 | Kusumi | B60H 1/00764 165/42 |
| 2016/0185352 A1 | 6/2016 | Burow et al. | |
| 2017/0174068 A1 | 6/2017 | Koch et al. | |
| 2019/0077258 A1* | 3/2019 | Cho | B60K 6/52 |

OTHER PUBLICATIONS

Patents Act 1977: Combined Search and Examination Report under Sections 17 and 18(3) corresponding to Great Britain Application No. GB2005800.4, dated Aug. 19, 2020, 8 pages.

Patents Act 1977: Examination Report under Section 18(3) corresponding to Great Britain Application No. GB2005800.4, dated May 10, 2022, 7 pages.

Patents Act 1977: Examination Report under Section 18(3) corresponding to Great Britain Application No. GB2005800.4, dated Sep. 28, 2022, 3 pages.

International Search Report and Written Opinion corresponding to International Application No. PCT/EP2021/060449, dated Jul. 5, 2021, 12 pages.

European Office Action corresponding to application 21721464.2, dated Feb. 26, 2025, 10 pages.

* cited by examiner

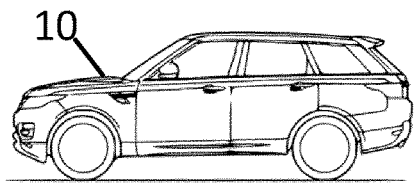
Fig 1
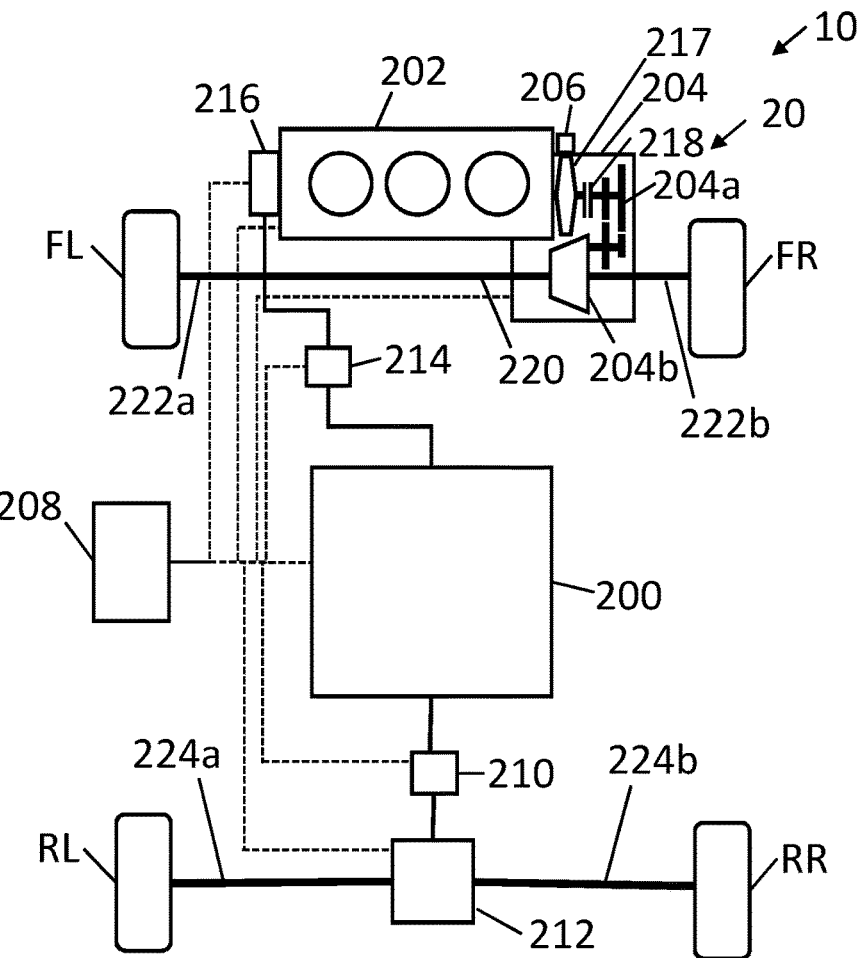
Fig 2
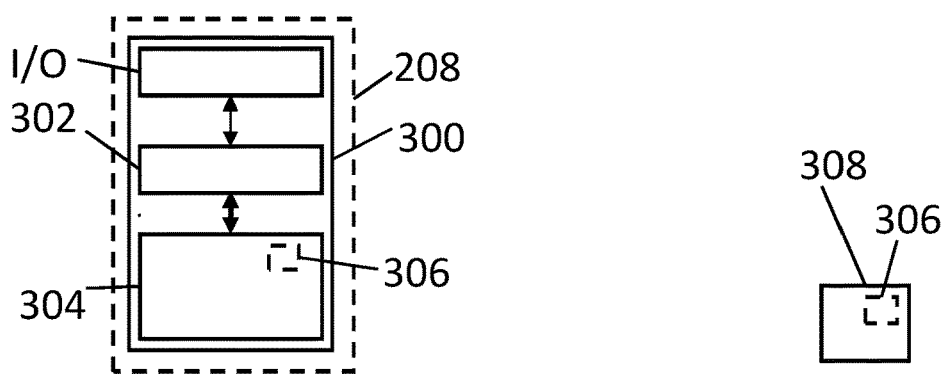
Fig 3A
Fig 3B

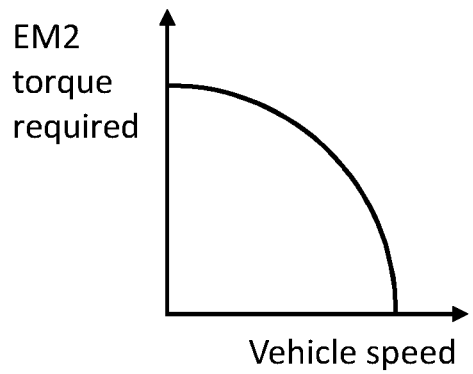
Fig 5A
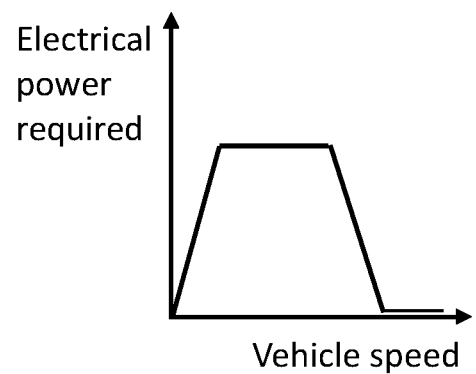
Fig 5B
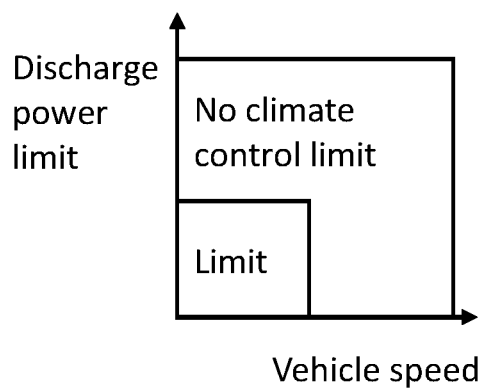
Fig 6
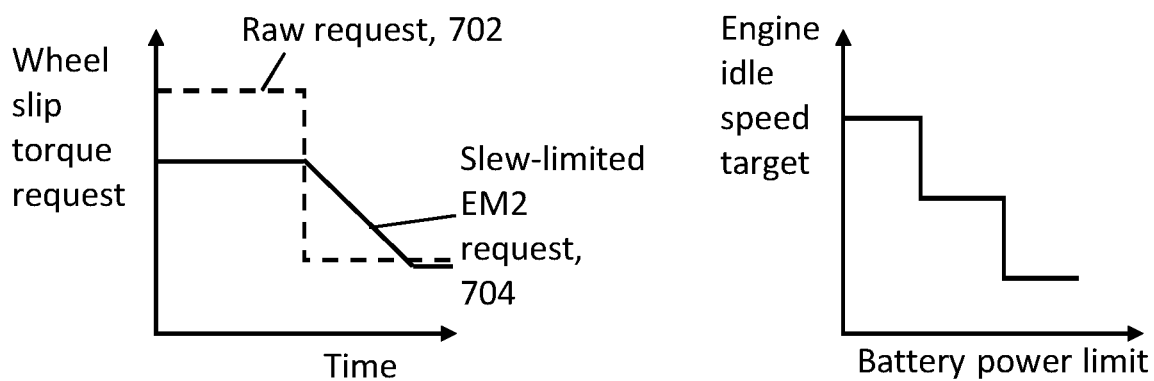
Fig 7
Fig 8

MAINTAINING MULTI-AXLE DRIVE CAPABILITY IN A HYBRID VEHICLE

TECHNICAL FIELD

The present disclosure relates to maintaining multi-axle drive capability in a hybrid vehicle. In particular, but not exclusively it relates to a method of maintaining all-wheel drive capability in a vehicle with an engine-driven axle and an electrically-driven axle.

BACKGROUND

A recent all-wheel drive hybrid vehicle architecture comprises an engine-driven axle and an electrically-driven axle. Electrical power from a traction battery for driving the electrically-driven axle may not always be available, for example when a state of charge of the traction battery is low or temperature is outside an operating window. Therefore, all-wheel drive may be intermittent and occasionally the engine-driven axle will be the only available axle while there is internal combustion engine fuel available. This is inconvenient when high traction is required, for example when pulling away on low-friction surfaces, on high drag surfaces, or on gradients, or when attempting to make progress on high drag surfaces.

SUMMARY OF THE INVENTION

It is an aim of the present invention to address one or more of the disadvantages associated with the prior art.

Aspects and embodiments of the invention provide a control system, a system, a vehicle, a method, and computer software as claimed in the appended claims.

According to an aspect of the invention there is provided a control system for maintaining multi-axle drive capability in a vehicle, the control system comprising one or more controllers, wherein the control system is configured to: operate an internal combustion engine to provide a torque to a first axle of the vehicle, and to a first electric machine to generate electrical power; control the generation of electrical power by the first electric machine in dependence on a requirement for torque at a second axle of the vehicle; and operate a second electric machine to receive the electrical power generated by the first electric machine and provide the torque to the second axle.

An advantage is increasing multi-axle drive availability, by operating the engine as a generator for the second electric machine while both the engine and the second electric machine are connected to the vehicle wheels.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to perform the controlling and the operating of the internal combustion engine and the first and second electric machines.

The control system may be configured to: determine electric machine torque required for the second axle, indicating the requirement for torque at the second axle; determine electrical power required to provide the determined electric machine torque at the second axle, determine internal combustion engine torque required to be provided by the internal combustion engine to enable the first electric machine to generate the determined electrical power; and control the internal combustion engine to provide the determined internal combustion engine torque in addition to torque required for the first axle.

The control system may be configured to: restrict the determined electrical power in dependence on electrical power generation capability of the first electric machine, the electrical power generation capability of the first electric machine being dependent on a torque capability of the internal combustion engine.

The control system may be configured to determine whether a condition is satisfied, wherein satisfaction of the condition is dependent on information indicative of available electrical power of an electrical energy storage means of the vehicle, and: if the condition is satisfied, enable the requirement for torque at the second axle to require electrical power in excess of the available electrical power of the electrical energy storage means, wherein the first electric machine generates the required electrical power; and if the condition is not satisfied, control the requirement for torque at the second axle to require electrical power not in excess of the available electrical power of the energy storage means.

Satisfaction of the condition may require at least the available electrical power to be below a threshold.

Satisfaction of the condition may require at least the second electric machine to be in a torque control mode enabling the internal combustion engine and the first electric machine to generate electrical power for the second electric machine in dependence on the requirement for torque at the second axle, wherein the second electric machine is further controllable in a voltage control mode in which the first and/or second electric machine is configured to generate electrical power in dependence on a voltage requirement.

The control system may be configured to restrict a magnitude and/or a rate of change of electrical power for climate control in dependence on satisfaction of the condition and/or the available electrical power and/or vehicle speed.

The control system may be configured to reduce a rate of change of a torque request from a vehicle stability function in response to detected or predicted wheel slip, in dependence on satisfaction of the condition.

The control system may be configured to increase an engine idle speed setpoint when the condition is satisfied.

The requirement for torque at the second axle, and the torque of the internal combustion engine for the first axle, may be dependent on a required torque split between the first axle and the second axle.

The torque required for the second axle may be dependent on vehicle speed.

The torque required for the second axle may decrease as vehicle speed increases.

The control system may be configured to: determine a terrain mode and/or type for the vehicle; and provide the multi-axle drive capability, based at least on the terrain mode and/or type.

Determining a change of terrain type may comprise determining the characteristics and/or type of surface that the vehicle is currently being driven on.

Determining a change of terrain mode may comprise receiving at least one input from a user of the vehicle selecting a terrain mode of the vehicle.

The control system may be configured to: determine a torque limit for torque provided from the internal combustion engine towards the first axle of the vehicle; and provide the multi-axle drive capability, based at least on the torque limit.

The vehicle may be configured to mechanically provide torque from the internal combustion engine to the first axle and from the second electric machine to the second axle, but may not be capable of mechanically providing torque from the internal combustion engine to the second axle and may not be capable of mechanically providing torque from the second electric machine to the first axle.

The first electric machine may be a belt integrated starter generator, and the electrical energy storage means may be a traction battery.

According to an aspect of the invention there is provided a system comprising the control system, the first electric machine, and the second electric machine.

According to an aspect of the invention there is provided a vehicle comprising the control system, and the system.

According to an aspect of the invention there is provided a method of maintaining multi-axle drive capability in a vehicle, the method comprising: operating an internal combustion engine to provide a torque to a first axle of the vehicle, and to a first electric machine to generate electrical power; controlling the generation of electrical power by the first electric machine in dependence on a requirement for torque at a second axle of the vehicle; and operating a second electric machine to receive the electrical power generated by the first electric machine and provide the torque to the second axle.

According to an aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a vehicle;
FIG. 2 illustrates an example of a system;

FIGS. 3A, 3B illustrate an example of a control system and of a non-transitory computer-readable storage medium;
FIGS. 5A and 5B illustrate an example graph of torque and target traction power required by electric machines in dependence on vehicle speed;
FIG. 6 illustrates an example graph of allowed climate control load dependent on a battery power limit and vehicle speed;
FIG. 7 illustrates an example graph of torque required by a second electric machine in dependence on a vehicle stability function;
and
FIG. 8 illustrates an example graph of engine idle speed dependent on a battery power limit.

DETAILED DESCRIPTION

Figure 4:
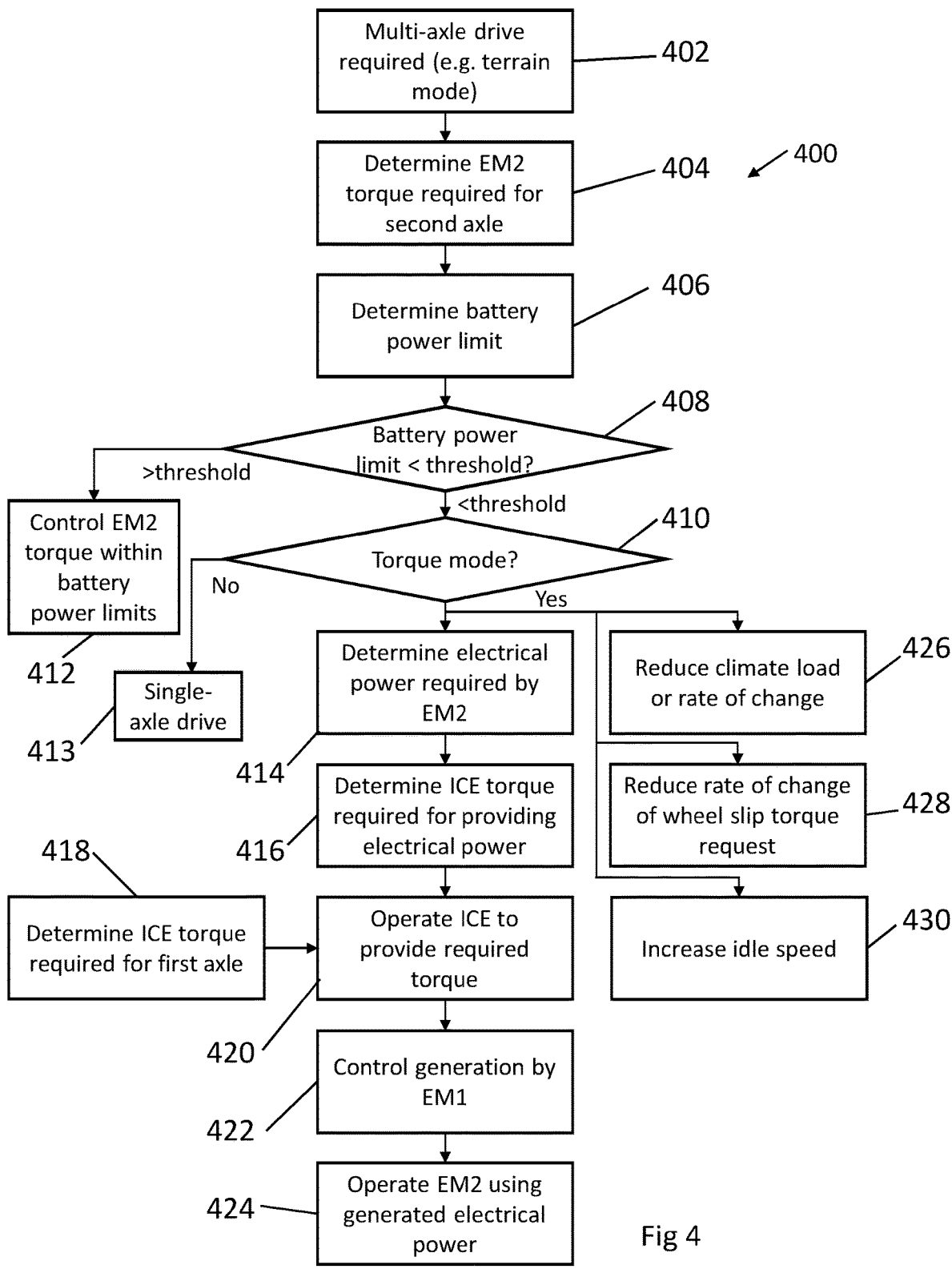
FIG. 4 illustrates an example of a method.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 is a hybrid electric vehicle (HEV). The HEV may comprise an electric-only mode of propulsion. Further, the vehicle 10 may be configured to operate as a parallel HEV. Parallel HEVs comprise a torque path between the engine and at least one vehicle wheel, as well as a torque path between an electric machine and at least one vehicle wheel. The torque path(s) may be disconnectable by a torque path connector such as a clutch or transmission. Typically, parallel HEVs differ from series HEVs, because in series HEVs the purpose of the engine is to generate electrical energy and there is no torque path between the engine and vehicle wheels. However, some types of parallel HEVs may be configurable to operate as a series HEV, such as 'through-the-road' hybrids. In this case we may usefully describe such a hybrid vehicle as operating in a parallel HEV mode or in a series HEV mode, depending on whether torque is being delivered from the engine directly to the vehicle wheels.

FIG. 2 illustrates an example system 20 for an HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises one or more torque sources. A torque source refers to a prime mover, such as an engine, an electric machine, or the like. The illustrated system 20 comprises an engine 202. The engine 202 is an internal combustion engine (ICE). The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises a transmission 204 for receiving output torque from the engine 202. The transmission 204 may comprise an automatic vehicle transmission, a manual vehicle transmission, or a semi-automatic vehicle transmission. The transmission 204 may comprise one or more torque path connectors 218, a torque converter 217, and a gear train 204a. The gear train 204a is configured to provide a selected gear reduction in accordance with a selected gear of the vehicle 10. The gear train 204a may comprise five or more different selectable gear reductions. The gear train 204a may comprise at least one reverse gear and a neutral gear.

The system 20 may comprise a differential 204b which is a second gear train for receiving output torque from the gear train 204a. The differential 204b may be integrated into the transmission 204 as a transaxle, or provided separately.

The engine 202 is mechanically connected (coupled) or connectable (couplable) to provide positive torque to a first set of vehicle wheels (FL, FR) via a torque path 220. The torque path 220 extends from an output of the engine 202 to the transmission 204, then and then to first set of vehicle wheels (FL, FR) via a first axle or axles 222a, 222b. In a vehicle overrun and/or friction braking situation, negative torque may flow from the first set of vehicle wheels (FL, FR) to the engine 202.

The illustrated first set of vehicle wheels (FL, FR) comprises front wheels, and the axles 222a, 222b are front transverse axles. Therefore, the system 20 is configured for front wheel drive by the engine 202. In another example, the first set of vehicle wheels (FL, FR) comprises rear wheels. The illustrated first set of vehicle wheels (FL, FR) is a pair of vehicle wheels, however a different number of vehicle wheels and axles could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space.

A torque path connector 218 may be provided inside and/or outside a bell housing of the transmission 204. The torque path connector 218 is configured to connect and configured to disconnect the torque path 220 between the engine 202 and the first set of vehicle wheels (FL, FR). The torque path connector 218 may be a part of the torque converter 217 or gear train 204a, or may be a separate friction clutch. The system 20 may be configured to automatically actuate the torque path connector 218 without user intervention.

The system 20 comprises a first electric machine 216. The first electric machine 216 may be an alternating current induction motor or a permanent magnet motor, or another type of motor. The first electric machine 216 is located so that when the torque path 220 is disconnected from the first set of vehicle wheels (FL, FR), the first electric machine 216 is also disconnected. Alternatively, the first electric machine 216 may be located so that it remains connected to the first set of vehicle wheels (FL, FR).

The first electric machine 216 may be mechanically coupled to the engine 202 via a belt or chain. For example, the first electric machine 216 may be a belt integrated starter generator (BISG). The first electric machine 216 and the engine 202 together form a torque source for the first set of vehicle wheels (FL, FR). In the illustration, the first electric machine 216 is located at an accessory drive end of the engine 202, opposite a vehicle transmission end of the engine 202. In an alternative example, the first electric machine 216 is a crankshaft integrated motor generator (CIMG), located at a vehicle transmission end of the engine 202. A CIMG may be capable of sustained electric-only driving unlike typical BISGs.

The first electric machine 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; generating power for ancillary loads; and/or regenerative braking in a regeneration mode. In a parallel HEV mode, the engine 202 and first electric machine 216 may both be operable to supply positive torque simultaneously to boost output torque. The first electric machine 216 may be incapable of sustained electric-only driving. In an alternative example, the first electric machine 216 is not controllable to provide positive torque other than to start the engine 202. In further examples, a pinion starter 206 is provided for starting the engine 202.

FIG. 2 illustrates a second electric machine 212, also referred to as an electric traction motor, configured to enable at least an electric vehicle mode comprising electric-only driving. Another term for the second electric machine 212 is an electric drive unit. In some, but not necessarily all examples, a nominal maximum torque of the second electric machine 212 is greater than a nominal maximum torque of the first electric machine 216.

Even if the torque path 220 between the engine 202 and the first set of vehicle wheels (FL, FR) is disconnected, the vehicle 10 can be driven in electric vehicle mode because the second electric machine 212 is connected to at least one vehicle wheel.

The illustrated second electric machine 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric machine 212 is operable to provide torque to the rear wheels RL, RR via a second, rear transverse axle or axles 224a, 224b. Therefore, the illustrated vehicle 10 is rear wheel driven in electric vehicle mode. In an alternative example, the second set of vehicle wheels comprises at least one vehicle wheel of the first set of vehicle wheels. In a further alternative implementation, the second electric machine 212 is replaced with two electric machines, one for each rear vehicle wheel RL, RR.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric machine 216 will also be disconnected from the first set of vehicle wheels (FL, FR).

Another benefit of the second electric machine 212 is that the second electric machine 212 may also be configured to be operable in a parallel HEV mode, to enable four-wheel drive operation despite the absence of a centre driveshaft.

In order to store electrical energy for the electric machines, the system 20 comprises an electrical energy storage means such as a traction battery 200. The traction battery 200 provides a nominal voltage required by electrical power users such as the electric machines.

The traction battery 200 may be a high voltage battery. High voltage traction batteries provide nominal voltages in the hundreds of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10. Energy storage might also be provided by other means such as supercapacitors or kinetic energy storage means such as flywheels, or by a combination of such means.

The first electric machine 216 and second electric machine 212 may be configured to receive electrical energy from the same traction battery 200 as shown.

Finally, the illustrated system 20 comprises inverters. Two inverters 210, 214 are shown, one for each electric traction motor. In other examples, one inverter or more than two inverters could be provided.

In an alternative implementation, the vehicle 10 may be other than shown in FIG. 2. For example, the first electric machine 216 may be connected through a clutch or gear to the engine 202, or may be located at the opposite end of the engine, possibly within the transmission 204 or on a driveshaft.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one processor 302; and at least one memory device 304 electrically coupled to the electronic processor 302 and having instructions 306 (e.g. a computer program) stored therein, the at least one memory device 304 and the instructions 306 configured to, with the at least one processor 302, cause any one or more of the methods described herein to be performed. The processor 302 may have an electrical input/output I/O or electrical input for receiving information and interacting with external components.

FIG. 3B illustrates a non-transitory computer-readable storage medium 308 comprising the instructions 306 (computer software).

The control system 208 may be configured to provide controller outputs to manipulate a variable (torque) towards a setpoint. An example setpoint is a torque target or a speed target.

Output torque may be manipulated to satisfy at least one received torque request. A torque request may be a load-based torque request for driving the vehicle 10. This type of torque request may be referred to as a vehicle torque request or a total torque request for the whole vehicle, and is not specific to any particular torque source. The total torque request may be for a torque at the vehicle wheels. A load may be based on a driver torque demand (e.g. torque setpoint based on accelerator pedal depression APD), or autonomous driving torque demand, and/or dependent on a speed setpoint such as a cruise control speed setpoint.

Arbitration functions may be applied to change/increase the total torque request to satisfy a plurality of received torque requests including a load-based torque request and requests from other vehicle subsystems. A shaping function may smooth the arbitrated total torque request.

The control system 208 may derive, from the shaped arbitrated total torque request, an engine torque request for controlling output torque of the engine, and/or an electric machine torque request(s) for controlling output torque of an electric machine or each electric machine, depending on a vehicle operating mode of the vehicle 10. A required torque split distribution function may control the derivation of the engine torque request and the electric machine torque request, wherein the electric machine is the second electric machine 212.

The required torque split may be a ratio. The torque split in this example is a front:rear torque split, between torque at the front and rear axles. The required torque split helps to maintain all-wheel drive balance of the vehicle 10 (front-biased, rear-biased, or 50:50). In some examples, the required torque split may vary dynamically. The required torque split may depend on variables such as: a driving dynamics mode; a terrain mode and/or a terrain type; vehicle speed; vehicle steering; lateral acceleration; and/or longitudinal acceleration.

Shaping functions may be applied to smooth the engine and electric machine torque requests around a zero-crossing point (lash crossing), resulting in shaped engine and electric machine torque requests.

A system 20 such as the powertrain of FIG. 2 can be operated in a plurality of vehicle operating modes. In one or more modes, the engine 202 is deactivated and the torque path 220 between the engine 202 and the first set of vehicle wheels (FL, FR) is disconnected. In another one or more modes, the engine 202 is re-activated and the torque path 220 is re-connected.

In electric vehicle mode, the engine 202 is in a deactivated state and the torque path 220 between the first set of vehicle wheels (FL, FR) and the engine 202 is disconnected. In an example, the effect of the combined deactivation and disconnection is that engine speed falls towards zero. Deactivation relates to the engine 202 producing no positive output torque or insufficient positive output torque for driving. Fuel injection may cease, to reduce fuel consumption.

In series HEV mode, the engine 202 is in an activated state but the torque path 220 is disconnected. The engine 202 and the first electric machine 216 generate electrical power, and the second electric machine 212 provides torque to the second set of vehicle wheels (RL, RR).

In parallel HEV mode, the engine 202 is in an activated state and the torque path 220 is connected. In the activated state, fuel is combusted in the engine's combustion chambers, causing the engine 202 to provide positive output torque to the torque path 220. One or both of the electric machines 212, 216 provides torque to vehicle wheels. If the second electric machine 212 is used, all-wheel drive is available. The engine 202 and the first electric machine 216 may optionally generate electrical power.

In an internal combustion engine mode, the engine 202 is in an activated state and the torque path 220 is connected. However, the first and second electric machines 212, 216 are not operable as motors to provide torque to the vehicle wheels. The engine 202 and the first electric machine 216 may optionally generate electrical power. The second electric machine 212 may optionally generate electrical power.

The vehicle operating mode may be selectable manually, semi-automatically, or automatically. A transition condition for changing to a vehicle operating mode that allows more charging than a current mode (e.g. exit electric vehicle mode) may require at least one of: a manual user selection; a traction battery state of charge falling below a threshold; a temperature being below a threshold (e.g. freezing weather); a change of driving dynamics mode; a change of terrain mode; an increase in power consumption due to a high load ancillary device being required to operate, such as an air conditioner unit or a heated windscreen; and/or the like.

A transition condition for changing to a vehicle operating mode that allows more net torque than a current mode and/or all-wheel drive (e.g. parallel HEV mode) may require at least one of: a manual user selection; a torque request rising above a threshold (e.g. kickdown function); a change of driving dynamics mode; a change of terrain mode; and/or the like.

A transition condition for changing to a vehicle operating mode that allows more electric driving than a current mode (e.g. one of the HEV modes or electric vehicle mode) may require at least one of: a manual user selection; a traction battery state of charge rising above a threshold; torque request falling below a threshold; a temperature being above a threshold; a change of driving dynamics mode; a change of terrain mode; and/or the like.

A driving dynamics mode refers to a mode that may configure one or more of: a suspension setting; a throttle response setting; a gear shift point setting; a vehicle braking or traction control setting; a torque distribution setting; a torque shaping setting; a steering weighting setting; and/or other settings.

A terrain mode generally refers to vehicle modes optimized for driving over particular driving surfaces. An example of a terrain mode is an off-road terrain mode, arranged to optimize the vehicle for driving over off-road terrain such as may be required when traversing areas of grass, gravel, sand, mud or even crawling over rocks. Another example of a terrain mode is a surface vehicle optimization mode, arranged to optimize the vehicle for driving over low friction surfaces such as snow or ice covered surfaces, either on or off road. A vehicle may comprise a base on-road mode and/or a base surface vehicle optimization mode for regular surfaces, and may comprise a plurality of terrain modes for various surfaces and/or terrain.

A terrain mode and/or detection of a particular terrain type may configure one or more surface traction-related settings such as a differential locking setting and/or a traction control setting. Additionally, or alternatively, other settings could be adjusted such as: a suspension setting; a ride height setting; a suspension damper setting; a throttle response setting; a gear shift point setting; a vehicle braking or traction control setting; a torque distribution setting; a torque shaping setting; or a steering weighting setting. There may be overlap between driving dynamics modes and terrain modes. The settings may be predetermined or configurable.

A manual user selection may comprise use of a human-machine interface input device. The input device may comprise an engine start button. The input device may comprise a driving dynamics mode selector. The input device may comprise a terrain mode selector. In some examples, a terrain mode and/or driving dynamics mode may be changeable automatically.

In accordance with an aspect of the invention, and as shown in part of FIG. 4, there is provided a computer-implemented method 400 of maintaining multi-axle drive capability in a vehicle 10, the method 400 comprising at least:
  operating the internal combustion engine 202 to provide a torque to the first axle 222a, 222b of the vehicle 10, and to the first electric machine 216 to generate electrical power;
  controlling the generation of electrical power by the first electric machine 216 in dependence on a requirement for torque at the second axle 224a, 224b of the vehicle 10; and
  operating the second electric machine 212 to receive the electrical power generated by the first electric machine 216 and provide the torque to the second axle 224a, 224b. The method 400 is performed by the control system 208. The electrical energy storage means is a traction battery 200.

At block 402, the method 400 comprises determining that multi-axle drive is required. In the following example, but not necessarily all examples, multi-axle drive is all-wheel drive in which all wheels of the vehicle 10 receive torque from a torque source. The first axle 222a, 222b may be a front axle and the second axle 224a, 224b may be a rear axle. If it is determined that all-wheel drive is required, the method 400 proceeds and the control system 208 controls simultaneous provision of torque from the engine 202 to the first axle 222a, 222b, and from the second electric machine 212 to the second axle 224a, 224b. If all-wheel drive is not required, the method 400 terminates and the control system 208 performs single-axle drive by controlling either the engine 202 and/or the first electric traction machine 216, or the second electric machine 212.

There are various methods for determining that all-wheel drive is required.

In some, but not necessarily all examples, determining that all-wheel drive is required may comprise determining a terrain mode of the vehicle 10. The terrain mode may be a terrain mode, as described above. Some terrain modes require all-wheel drive and some terrain modes do not require all-wheel drive. If the terrain mode requires all-wheel drive, the method 400 proceeds.

In some, but not necessarily all examples, determining that all-wheel drive is required may comprise determining a terrain type. The terrain type may be determined automatically or selected manually. Determining a terrain type may comprise receiving information indicative of a driving surface from a sensor. The sensor may comprise a camera, water depth sensor, a radar sensor (radio detection and ranging) or a lidar sensor (light detection and ranging). The information may be indicative of driving surface friction.

Examples of terrain types and/or modes that require all-wheel drive include: a grass/gravel/snow terrain type, a sand terrain type, a rocky terrain type, and wading. All-wheel drive may not be required if the terrain type is a paved road. All-wheel drive may remain engaged until the terrain type and/or mode changes and no longer requires all-wheel drive.

In some, but not necessarily all examples, determining that all-wheel drive is required comprises detecting wheel slip. Wheel slip detection may be performed by one or more wheel speed sensors of the vehicle 10, for example. If a vehicle wheel starts to slip, all-wheel drive may be engaged temporarily until wheel slip is no longer detected.

In some, but not necessarily all examples, determining that all-wheel drive is required comprises determining a torque limit for torque provided from the engine 202 towards the first axle 222a, 222b of the vehicle 10. An example of a torque limit is a transmission torque limit, for example. The transmission torque limit may impose a maximum torque that is permitted to be supplied to the transmission 204. If a received torque request comprising a load-based torque demand exceeds the torque limit, all-wheel drive may be engaged until the torque limit is no longer exceeded.

All-wheel drive is particularly desirable for users in some conditions where even relatively small amounts of power can have a significant impact on the capability of the vehicle 10. For example, in conditions where the road surface is slippery due to snow or ice it can be difficult for a two-wheel drive vehicle to pull away because of the limited amount of traction provided by the low friction surface. All-wheel drive may then be very useful in initiating vehicle movement. The power requirement for providing additional driving torque at low speeds is not very great, since power is a product of torque and speed. Hence, the present invention is able to provide significant degrees of customer benefit for relatively small amounts of power. In the above example it is quite likely that when there is snow or ice on the ground the traction battery is very cold and so may be unable to provide much power, which makes this invention especially desirable. In such scenarios the need for all-wheel drive becomes substantially reduced once the vehicle 10 has reached 30 kph and so the vehicle 10 may revert to two-wheel drive. However, the actual speed chosen for this change to two-wheel drive is dependent on the level of performance desired and the amount of power that can be provided. All-wheel drive provides a worthwhile benefit at speeds as low as 10 kph, or even lower.

Other scenarios where all-wheel drive is particularly beneficial at low speed include when pulling away on high drag surfaces such as deep snow or sand, or when pulling away on gradients, or slowly mounting a kerb, or when attempting to make progress on high drag surfaces.

The above examples are not exhaustive. All-wheel drive could be required for other reasons. For example, a human-machine interface in the form of a dedicated all-wheel drive selector may be provided.

Based on the determination that all-wheel drive is required, block 404 of the method 400 comprises determining torque required for the second axle 224a, 224b, and block 418 comprises determining torque required for the first axle 222a, 222b. In this example, the torque required for the second axle 224a, 224b is an electric machine torque request indicative of torque required by the second electric machine 212, and will be abbreviated to an EM2 torque request. The torque required for the first axle 222a, 222b may comprise an ICE torque request indicative of torque required from the engine 202, and optionally from the first electric machine 216. These two operations 404 and 418 may be performed concurrently during all-wheel drive operation.

In an implementation, blocks 404 and 418 derive, from a received total torque request, the torque required for the second axle 224a, 224b, and the torque required for the first axle 222a, 222b. The received torque request comprises a load-based torque request, for example indicative of APD, and may comprise other torque requests from other energy consumers such as climate control.

The relative magnitudes of the torques required for the first and second axles 222a, 222b, 224a, 224b may depend on a required torque split between the first and second axle. The required torque split controls the above derivation of the ICE torque request and the EM2 torque request.

The required torque split may be a ratio. The torque split in this example is a front:rear torque split, between torque at the front and rear axles. The required torque split helps to maintain balance of the vehicle 10 (front-biased, rear-biased, or 50:50). In some examples, the required torque split may vary dynamically. The required torque split may vary in dependence on a driving dynamics mode, a terrain mode and/or a terrain type, vehicle speed, vehicle steering; lateral acceleration; and/or longitudinal acceleration; and/or other factors.

At block 406, the method 400 comprises obtaining information indicative of available electrical power of the traction battery 200. The available electrical power may be presented as an available electrical current. This information is for indicating whether the traction battery 200 is capable of supplying enough electrical power to enable the second electric machine 212 to provide enough torque to satisfy the electric machine torque request in addition to the background electrical loads that requested from the electrical system. These background electrical loads comprise high voltage and low voltage loads. High voltage loads typically comprise air conditioning compressor loads which, on electrified vehicles, normally operate at the same voltage as the traction battery. Low voltage loads comprise a variety of vehicular components operating at 12 volts, or sometimes 48 volts, such as windscreen wipers, heaters, lights and infotainment systems. These low voltage loads are supplied from the output of a DCDC converter (not shown) fed with power from the high voltage system and controlled by the control system 208. Therefore, in an implementation, the available electrical power of the traction battery 200 is required in order to indicate whether electrical loads may all be satisfied, such as DCDC, air conditioning loads and electric motor 212 requirements.

In an implementation, the information determined at block 406 indicates a battery power limit of the traction battery 200. The battery power limit indicates a maximum instant electrical power that can be requested from the traction battery 200. The battery power limit may be determined by a known battery management system. The battery power limit may reduce with conditions such as detected temperatures below a threshold and/or above a threshold, state of charge below a threshold and/or state of health of the traction battery 200 below a threshold.

If the above conditions are optimal, the battery power limit may be high enough to enable all-wheel drive that fully satisfies the torque request and the required torque split as well as the background electrical loads. This is not always the case, however.

Next, the method 400 determines whether a condition is satisfied. In FIG. 4, but not necessarily in all examples, two criteria must be met for the condition to be satisfied. Block 408 determines whether sufficient electrical power is available from the traction battery 200. Block 410 determines whether the second electric machine 216 is in a torque control mode enabling the engine 202 and the first electric machine 216 to generate electrical power for the second electric machine 212 in dependence on the requirement for torque at the second axle.

In more detail, decision block 408 may be implemented by determining whether the indicated available electrical power determined at block 406 is below a threshold. If the available electrical power of the traction battery 200 is above the threshold, then the traction battery 200 is capable of providing sufficient electrical power for all-wheel drive so the method 400 proceeds to block 412. The threshold may be fixed or variable. In an implementation, the first threshold is between approximately 10 kW and approximately 30 kW usable by the second electric machine 212, for vehicle pull-away on slippery surfaces.

At block 412, conditions are optimal so the method 400 comprises controlling the EM2 torque request to require electrical power not in excess of the available electrical power of the traction battery 200. In some examples, the available electrical power is the electrical power remaining after DCDC and air conditioning loads have been allocated their required power. In other words, the EM2 torque request is controlled so that the sum of battery power requests is within the battery power limit. The EM2 torque request may be saturated to a value no greater than a torque achievable within the battery power limit, if the battery power limit would otherwise be exceeded.

However, if the available electrical power is below the threshold, the battery power limit is not high enough to enable reliable all-wheel drive in required scenarios. The method 400 may therefore proceed to optional second decision block 410. The second criterion of block 410 requires the first electric machine 216 to be in a torque control mode. In the torque control mode, the first electric machine 216 is controllable based on torque requests, to generate electrical power from the engine 202 in dependence on the EM2 torque request. For example, the first electric machine 216 may be controlled to generate electrical power based on a torque setpoint (target). The torque setpoint is based on the EM2 torque request. The torque control mode enables the EM2 torque request for the second axle 224a, 224b to require electrical power in excess of the available electrical power of the traction battery 200 (e.g. battery power limit), to be generated by the first electric machine 216 operating as a generator. This enables the second electric machine 212 to consume greater electrical power than the available electrical power of the traction battery 200. It would be appreciated that the decision blocks 408, 410 could be performed in a different order from that shown.

In an implementation, the second electric machine 212 may require an electrical power from the range approximately 10-20 kW for vehicle pull-away on a slippery surface, requiring electrical energy generation from the range approximately 20-30 kW by the first electric machine 216, accounting for losses.

If the first electric machine 216 is not in the torque control mode, then electrical power cannot be generated by the first electric machine 216 based on the EM2 torque request. Therefore, the method 400 proceeds to block 413 in which single-axle drive is available. In the architecture of FIG. 2, this means that the vehicle 10 is limited to front-wheel drive. An example situation in which torque control mode is unavailable is when the first electric machine 216 is in a voltage control mode instead of a torque control mode. Voltage control mode may implement a voltage requirement. The voltage requirement may comprise a voltage setpoint. The voltage setpoint is configured so that critical electrical loads may all be satisfied. In the voltage control mode, the first electric machine 216 generates electrical current to maintain the voltage setpoint. The first electric traction motor 216 in voltage control mode is unavailable for being controlled based on a torque setpoint.

A condition for switching between the torque control mode and the voltage control mode is dependent, for example, on available electrical power, state of charge/health of the traction battery 200, temperature, and/or other variables. Voltage control mode is generally used in situations where the voltage setpoint cannot be maintained without additional electrical power generation via the engine 202 and first electric machine 216.

If the above condition is satisfied, then generation from the first electric machine 216 is required for providing electrical power to the second electric machine 212, so the method 400 proceeds to block 414.

At block 414, the method 400 comprises determining electrical power required to provide the determined EM2 torque. The conversion between electrical power and torque may be based on pre-calibration, and may account for known energy losses.

The electrical power determined at block 414 may be restricted in dependence on electrical power generation capability of the first electric machine 216. The electrical power generation capability may be based on a nominal maximum electrical power of the first electric machine 216.

In some, but not necessarily all examples, the electrical power generation capability of the first electric machine 216 may be based on the nominal maximum electrical power of the first electric machine 216 for a given torque capability of the engine 202. The torque capability of the engine 202 may be indicated by a nominal maximum torque that the engine 202 is capable of providing at a given detected operating point. The operating point may be defined by at least engine speed, for example, because torque capability typically varies with engine speed. Other factors include, for example, air pressure/temperature, other engine loads, etc. The first electric machine 216 and engine 202 may be capable of generating electrical power greater than the threshold when the engine speed is at or above a minimum engine speed. The minimum engine speed may be an engine idle speed, to enable reliable all-wheel drive.

If the EM2 torque request requires more Kilowatts of electrical power than the electrical power generation capability, then the electrical power determined at block 414 may be saturated to a magnitude at or below the electrical power generation capability.

In one implementation of block 414, determining the electrical power comprises determining the total electrical power required for satisfying the EM2 torque request, and then subtracting the available electrical power of the traction battery 200. The result is the excess electrical power required by generation from the engine 202 and first electric machine 216, which may be passed on to the subsequent blocks of the method 400. This enables the second electric machine 212 to receive a limited supply of energy from the traction battery 200, reducing the burden on electrical power generation. Alternatively, the required total electrical power may be generated with no contribution from the traction battery 200.

Once the electrical power is known from block 414, the method 400 proceeds to block 416 which comprises determining engine torque required to be provided by the engine 202 to enable the first electric machine 216 to generate the determined electrical power. The conversion between electrical power and engine torque may be based on pre-calibration, and may account for known energy losses.

Once the engine torque required for generating the determined electrical power is known, the method 400 proceeds to block 420 which comprises controlling the engine 202 to provide the determined engine torque (block 416) in addition to the determined torque required for the first axle 222a, 222b (block 418). Unlike a series HEV, the engine 202 is simultaneously providing torque directly to the first axle 222a, 222b via the connected torque path 220, and providing additional torque for conversion to electrical power and distribution to the second axle 224a, 224b. Electrical power is therefore generated even while the vehicle 10 is being propelled by the engine 202, enabling reliable all-wheel drive.

At the next block 422, the method 400 comprises controlling the generation of electrical power by the first electric machine 216. The determined engine torque provided at block 420 is converted to electrical power.

At the next block 424, the second electric machine 212 is operated to receive the electrical power generated by the first electric machine and provide the torque to the second axle 224a, 224b. Receiving the electrical power in the architecture of FIG. 2 comprises converting from alternating current to direct current and then back to alternating current. The first inverter 214 supplies the electrical power as a direct current to a DC bus that the traction battery 200 is operably coupled to. The second inverter 210 acts as a load and converts the direct current back to an alternating current for the second electric machine 212. No voltage conversion is required if both the first and second electric machines 216, 212 operate at the same voltage. Alternatively, the voltages may be converted if the first and second electric machines 216, 212 operate at different voltages. At block 424, the torque is provided to the second axle 224a, 224b while the engine 202 provides torque to the first axle 222a, 222b.

FIG. 5A is a graph illustrating the EM2 torque required for satisfactory vehicle pull-away from rest, in a typical low-friction scenario. The EM2 torque request is dependent on vehicle speed with the shape of the curve being dependent on the type of use case to be satisfied. Typically, the EM2 torque request is relatively high at vehicle rest and at a relatively low vehicle speed but reduced at higher speed. For a typical road vehicle 10, the EM2 torque request may require less than 20 kW of electrical power, such as 16 kW. The electrical power requested of the first electric machine 216 for satisfying the EM2 torque request may be a value less than 30 kW, such as 25 kW, accounting for energy losses. The electrical power may be within the electrical power generation capability of the first electric machine 216.

The EM2 torque request reduces as the vehicle speed increases. This is because eventually it becomes inefficient (due to the losses from power conversions) for the second electric machine 212 to keep receiving additional electrical power from the first electric machine 216 in excess of the available electrical power of the traction battery 202. Once the vehicle 10 is travelling at a reasonable speed of, for example 30 kilometres per hour, the need for torque at the second axle 224a, 224b is significantly reduced. The reasonable speed may be a rising speed threshold that causes the control system 208 to disable the torque control mode, such that the vehicle 10 may return to two-wheel drive operation. This is why the graph of FIG. 5A drops to zero at high vehicle speeds. The threshold may comprise a binary threshold or a blending function.

FIG. 5B illustrates an example of the target traction power required by generation via the first electric machine 216, in addition to the available battery power. The target traction power varies with vehicle speed, as shown. At zero speed, high torque is produced but the power is zero as power is a function of speed. Once the vehicle moves, the power increases with an initial ramp-up, dependent on the engine's capability for charging which is restricted at lower engine speed. Although vehicle pullaway requires high torque, high power is not required. After reaching a peak, the power requirement reduces at higher vehicle speeds.

According to FIG. 4, but not necessarily all examples, satisfaction of the earlier-defined condition 408, 410 may also control more electrical power requests or torque requests associated with one or more other energy-consuming vehicle subsystems. Blocks 426, 428 and 430 provide examples of such control. One aspect of the control comprises reducing load (magnitude of electrical power/torque request) from the other vehicle subsystem(s), to increase the electrical power available for the second axle 224a, 224b. Additionally or alternatively, another aspect of control comprises reducing a rate of change of the electrical power/torque request from the other vehicle subsystem(s), to reduce the likelihood of momentary over-powering of the DC bus by the first electric machine 216. The traction battery 200 may act as an energy sink for over-powering events, provided they do not exceed power limits of the traction battery. Although maximizing the use of available battery power can help to keep the traction battery warm, exceeding reported available battery power should be avoided.

Block 426 comprises restricting a magnitude and/or a rate of change of electrical power for climate control. The restriction may comprise an upper limit, for example. A trigger for block 426 may comprise satisfaction of the condition 408, 410. It would be appreciated, however, that the trigger could alternatively require satisfaction of a more restrictive condition which may depend on available electrical power of the traction battery 200 and/or vehicle speed.

FIG. 6 illustrates an example control map for climate control. The control map depends on the available electrical power of the traction battery 200 such as a discharge power limit, and on any suitable indicator of vehicle speed (may be a wheel speed sensor). When the available electrical power is above a threshold, the magnitude/rate of change of electrical power for climate control is not limited or an existing limit is relatively high. When the available electrical power is below the threshold, the magnitude/rate of change is limited or the existing limit is made relatively low. When the vehicle speed is above a threshold, the magnitude/rate of change of electrical power for climate control is not limited or an existing limit is relatively high. When the vehicle speed is below the threshold, the magnitude/rate of change is limited or the existing limit is made relatively low, because traction is a higher priority at low speed when in the torque control mode.

Block 428 comprises reducing a rate of change (slew rate) of a torque request received from a vehicle stability function in response to detected or predicted wheel slip. The vehicle stability function may be configured to reduce net torque at an axle at which the wheel slip is detected/expected, by applying friction brakes and/or requesting negative torque from the first or second electric machine 216, 212, and/or by reducing engine torque. A trigger for block 428 may comprise satisfaction of the condition 408, 410, or a more restrictive condition such as described above.

FIG. 7 is a graph illustrating temporal variation of an example unmodified (raw) torque request 702 originating from the vehicle stability function, and a modified version of the EM2 torque request 704. In this case, the raw torque request comprises a steep gradient such as a discontinuity in the form of a step. The control system 208, upon receiving the raw torque request, may derive an EM2 torque request and/or an engine torque request, for example according to the required torque split. In some examples, the vehicle stability function may influence the required torque split. The control system 208 then applies a rate limiter function in accordance with block 428, that reduces the rate of change of at least the EM2 torque request. This rate limiter function may limit the rate of change to that achievable by an internal combustion engine.

Block 430 comprises increasing engine torque to maintain a raised engine idle speed setpoint. This is because as engine speed increases, the engine's torque capability improves. The engine 202 can provide more torque and may respond to the EM2 torque request with less latency to reduce the chance of an over-power event. A trigger for block 430 may comprise satisfaction of the condition 408, 410, or a more restrictive condition such as described above.

FIG. 8 is a graph illustrating variation of the engine idle speed setpoint (target) with the available electrical power of the traction battery 200. The engine idle speed setpoint may have a relatively low, normal value when the available electrical power is above a threshold. The threshold may be the above-mentioned threshold of block 406, or different. When the available electrical power is below the threshold, the engine idle speed setpoint may be raised, for example by 100 revolutions per minute (rpm) or more. In FIG. 8, but not necessarily all examples, the engine idle speed setpoint may be raised again (by at least 100 rpm) when a further, lower threshold of available electrical power is exceeded. In some examples, the raised engine idle speed setpoint(s) may be less than 1500 rpm for efficiency.

A further method for reducing the likelihood of overpower events is to reduce latency of command signals by reducing the use of signals between controllers 300 over a communication bus. Communication buses are slow. For example, if a separate controller 300 is normally responsible for determining ICE torque requests (block 418) and is assigned responsibility for blocks 416 onwards, said controller 300 may be made responsible for earlier operations including block 414. This configures the controller 300 to predict what the EM2 torque request is expected to be, rather than waiting to receive the EM2 torque request from a first controller 300 via a communication bus. To achieve this functionality, torque request algorithms may be replicated between controllers 300. When all-wheel drive is not required and/or the condition is not satisfied, the torque request control may revert to communication bus requests between controllers 300.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method 400 and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for maintaining multi-axle drive capability in a vehicle, the vehicle comprising:
no longitudinal drive shaft is provided;
an internal combustion engine configured to provide torque to a first axle of the vehicle and to a first electric machine and not configured to provide torque to a second axle of the vehicle; and
a second electric machine configured to provide torque to the second axle and not configured to provide torque to the first axle, wherein the first axle is a front axle and the second axle is a rear axle;
the control system comprising one or more controllers, wherein the control system is configured to:
determine available electrical power of an electrical energy storage means of the vehicle;
determine whether a condition is satisfied, wherein satisfaction of the condition requires at least the available electrical power of the electrical energy storage means to be below a threshold;
if the condition is not satisfied:
operate the internal combustion engine to provide torque to the first axle of the vehicle; and
control a torque request for the second electric machine to require electrical power not in excess of the available electrical power of the electrical energy storage means; and
if the condition is satisfied:
operate the internal combustion engine to provide a torque to the first axle of the vehicle, and to the first electric machine to generate electrical power;
control the generation of electrical power by the first electric machine in dependence on a requirement for torque at the second axle of the vehicle;
and operate the second electric machine to receive the electrical power generated by the first electric machine and provide the required torque to the second axle.

2. The control system of claim 1, configured to:
determine electric machine torque required for the second axle, indicating the requirement for torque at the second axle;

determine electrical power required to provide the determined electric machine torque at the second axle, determine internal combustion engine torque required to be provided by the internal combustion engine to enable the first electric machine to generate the determined electrical power; and control the internal combustion engine to provide the determined internal combustion engine torque in addition to torque required for the first axle.

3. The control system of claim 2, configured to: restrict the determined electrical power in dependence on electrical power generation capability of the first electric machine, the electrical power generation capability of the first electric machine being dependent on a torque capability of the internal combustion engine.

4. The control system of claim 1, configured to determine whether the condition is satisfied, wherein satisfaction of the condition is dependent on information indicative of the available electrical power of the electrical energy storage means of the vehicle, and:

if the condition is satisfied, enable the requirement for torque at the second axle to require electrical power in excess of the available electrical power of the electrical energy storage means, wherein the first electric machine generates the required electrical power; and if the condition is not satisfied, control the requirement for torque at the second axle to require electrical power not in excess of the available electrical power of the energy storage means.

5. The control system of claim 4, wherein satisfaction of the condition requires at least the second electric machine to be in a torque control mode enabling the internal combustion engine and the first electric machine to generate electrical power for the second electric machine in dependence on the requirement for torque at the second axle, wherein the second electric machine is further controllable in a voltage control mode in which the first and/or second electric machine is configured to generate electrical power in dependence on a voltage requirement.

6. The control system of claim 4, configured to restrict a magnitude and/or a rate of change of electrical power for climate control in dependence on satisfaction of the condition and/or the available electrical power and/or vehicle speed.

7. The control system of claim 4, configured to reduce a rate of change of the torque request or other torque request from a vehicle stability function in response to detected or predicted wheel slip, in dependence on satisfaction of the condition.

8. The control system of claim 4, configured to increase an engine idle speed setpoint when the condition is satisfied.

9. The control system of claim 1, wherein the requirement for torque at the second axle, and the torque of the internal combustion engine for the first axle, are dependent on a required torque split between the first axle and the second axle.

10. The control system of claim 1, wherein the torque required for the second axle is dependent on vehicle speed.

11. The control system of claim 1, configured to: determine a terrain mode and/or type for the vehicle; and provide the multi-axle drive capability, based at least on the terrain mode and/or type.

12. The control system of claim 1, configured to:
determine a torque limit for torque provided from the internal combustion engine towards the first axle of the vehicle; and provide the multi-axle drive capability, based at least on the torque limit.

13. The control system of claim 1, wherein the first electric machine is a belt integrated starter generator, and wherein the electrical energy storage means is a traction battery.

14. The vehicle comprising the control system of claim 1.

15. A method of maintaining multi-axle drive capability in a vehicle, the vehicle comprising:

no longitudinal drive shaft is provided;

an internal combustion engine configured to provide torque to a first axle of the vehicle and to a first electric machine; and a second electric machine configured to provide torque to a second axle of the vehicle, wherein the first axle is a front axle and the second axle is a rear axle;

the method comprising:

determining available electrical power of an electrical energy storage means of the vehicle;

determining whether a condition is satisfied, wherein satisfaction of the condition requires at least the available electrical power of the electrical energy storage means to be below a threshold;

if the condition is not satisfied:

operating an internal combustion engine to provide torque to the first axle of the vehicle; and controlling a torque request for the second electric machine to require electrical power not in excess of the available electrical power of the electrical energy storage means; and if the condition is satisfied:

operating the internal combustion engine to provide a torque to the first axle of the vehicle, and to the first electric machine to generate electrical power;

controlling the generation of electrical power by the first electric machine in dependence on a requirement for torque at the second axle of the vehicle; and operating the second electric machine to directly receive the electrical power generated by the first electric machine and provide the required torque to the second axle, wherein the electrical power generated by the first electric machine and received by the second electric machine is not received by the electrical energy storage means.

16. A non-transitory, computer-readable storage medium storing instructions thereon that, when executed by one or more electronic processors, causes the one or more electronic processors to carry out the method according to claim 15.

* * * * *